United States Patent [19]

Chikauchi

[11] Patent Number: 6,021,257
[45] Date of Patent: *Feb. 1, 2000

[54] MERGED IMAGE PRINT OUT SYSTEM AND METHOD THEREFOR

[75] Inventor: Masami Chikauchi, Iruma, Japan

[73] Assignees: Casio Computer Co., Ltd.; Casio Electronics Manufacturing Co., Ltd., both of Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/798,248

[22] Filed: Feb. 11, 1997

[30] Foreign Application Priority Data

Feb. 14, 1996 [JP] Japan .................................... 8-027136

[51] Int. Cl.[7] .................................................... G06F 15/00
[52] U.S. Cl. ......................... 395/109; 395/110; 395/114; 358/448; 358/540
[58] Field of Search .................................... 395/102, 109, 395/110, 114, 117; 358/537, 538, 540, 448, 452, 462; 382/176, 190, 290

[56] References Cited

U.S. PATENT DOCUMENTS 4,857,955  8/1989  Crandall .................................. 358/1.9

FOREIGN PATENT DOCUMENTS 0 493 085A2  7/1992  European Pat. Off. .
WO 97/41522  11/1997  WIPO .

OTHER PUBLICATIONS

Patent Abstracts of Japan, JP 62 221547, Kigoshi Toshiko, "Information Output Device", Sep. 1987, vol. 012 (Canon Inc.).
Patent Abstracts of Japan, JP 09 305371, Osawa Kazue, "Numeral Output Method", Nov. 1997, vol. 098, No. 003 (Casio Computer Co. Ltd.).
Patent Abstracts of Japan, JP 09 309231, Nozawa Toshiyuki, "Color Printing Device", Dec. 1997, vol. 098, No. 004 (Casio Computer Co. Ltd.).
Patent Abstracts of Japan, JP 10 024624, "Color Printer", Jan. 1998, vol. 098, No. 005 (Casio Computer Co. Ltd.).
Derwent Publications Ltd., London GB 98–071308, "Color image printer utilizing packed monochrome printing information—performs specified color printing in predetermined area based on designation from stain processing part", XP002105734—abstract.
Derwent Publications Ltd., London GB 98–153434, "Color printer used as output apparatus of e.g. computer—has printing unit which prints specific item data, included in printing data transferred from host computer, in color corresponding to color designations conditions stored in RAM", XP002105735—abstract.
Wordperfect 6.1 For Windows For Dummies 2nd Edition, 1994.
Microsoft Office 6–in–1 New Edition, 1994.

Primary Examiner—Dov Popovici
Assistant Examiner—Mark Wallerson
Attorney, Agent, or Firm—Frishauf, Holtz, Goodman, Langer & Chick, P.C.

[57] ABSTRACT

A form for printing print data, such as business data generated by an application program is generated by a form defining program. The form defining program designates a specific item (specific data item) in the form based on the predesignated print color of the form. A data discriminating section extracts data in a specific data item from the print data supplied from the application program. In accordance with the contents of the data in the specific data item, a color control command for changing the predesignated color of the form is generated. A printer controller change the color of the form in accordance with the color control command, supplied via a printer driver, and outputs the resultant data to a printing section. The printing section prints the print data in the color-changed form.

12 Claims, 19 Drawing Sheets

FIG.5A

| DESIGNATED COLOR | | COLOR TABLE NO. | | | | |
|---|---|---|---|---|---|---|
| | | 1 | 2 | 3 | .... | n |
| Y (YELLOW) | (1) | (2) | (3) | (4) | .... | (1) |
| M (MAGENTA) | (2) | (3) | (4) | (5) | .... | (2) |
| C (CYAN) | (3) | (4) | (5) | (6) | .... | (3) |
| K (BLACK) | (4) | (5) | (6) | (7) | .... | (4) |
| Y+M (RED) | (5) | (6) | (7) | (8) | .... | (5) |
| Y+C (GREEN) | (6) | (7) | (8) | (1) | .... | (6) |
| M+C (BLUE) | (7) | (8) | (1) | (2) | .... | (7) |
| NONE (WHITE) | (8) | (1) | (2) | (3) | .... | (8) |

FIG.5B

| DESIGNATED COLOR NO. | COLOR TABLE NO. | | | | |
|---|---|---|---|---|---|
| | 1 | 2 | 3 | .... | n |
| 1 | 9 | 17 | 25 | .... | 1 |
| 2 | 10 | 18 | 26 | .... | 2 |
| 3 | 11 | 19 | 27 | .... | 3 |
| 4 | 12 | 20 | 28 | .... | 4 |
| . | . | . | . | .... | |
| . | . | . | . | .... | |
| . | . | . | . | .... | |
| 64 | 8 | 16 | 24 | .... | 64 |

FIG.6

| SPECIFIC DATA VALUE | COLOR TABLE NO. |
|---|---|
| ××××××  | 1 |
| ×××××○ | 1 |
| . | . |
| ×○×××× | 2 |
| ×○×××○ | 2 |
| . | . |
| . | . |
| △○×××× | 8 |
| △○×××○ | 8 |

×, ○ AND △ : ARBITRARY CHARACTER

FIG.7A

EXAMPLE OF USAGE OF WILD CARD CHARACTER *
(* INDICATES AN ARBITRARY CHARACTER STRING)

AB*   ... CHARACTER STRING STARTING WITH AB,
          SUCH AS ABCD OR ABXY

123*  ... CHARACTER STRING STARTING WITH 123,
          SUCH AS 12345 OR 12389

FIG.7B

EXAMPLE OF USAGE OF WILD CARD CHARACTER ?
(? INDICATES ANY SINGLE CHARACTER)

?1    ... CHARACTER STRING WHOSE SECOND CHARACTER IS 1,
          SUCH AS A1, B1 OR C1

??A   ... CHARACTER STRING WHOSE THIRD CHARACTER IS A,
          SUCH AS 12A, 11A OR 99A

FIG.11

| SPECIFUC DATA VALUE | DESIGNATED COLOR NO. | DESIGNATED DENSITY VALUE |
|---|---|---|
| ×××××× | 1 | 20 |
| ×××××○ | 1 | 20 |
| . | . | . |
| ×○×××× | 2 | 40 |
| ×○×××○ | 2 | 40 |
| . | . | . |
| . | . | . |
| △○×××× | 64 | 60 |
| △○×××○ | 64 | 60 |

×, ○ AND △ : ARBITRARY CHARACTER

FIG.18A

| SPECIFIC DATA ITEM | PRINT COLOR DESIGNATION CONDITION |
|---|---|
| GENERAL AFFAIRS | #1 |
| DEVELOPMENT | #2 |
| BUSINESS | #3 |
| MATERIAL | #2 |
| PRODUCTION | #2 |

FIG.18B

| DESIGNATION OF #1 PRINT COLOR | DESIGNATION OF #2 PRINT COLOR | DESIGNATION OF #3 PRINT COLOR |
|---|---|---|
| RULED LINE ..... BLACK | RULED LINE ..... BLACK | RULED LINE ..... BLACK |
| UNDERLINE ..... GREEN | UNDERLINE ..... GREEN | UNDERLINE ..... BLUE |
| HATCHING 1 ..... BLUE | HATCHING 1 ..... BLUE | HATCHING 1 ..... BLUE |
| HATCHING 2 ..... RED | HATCHING 2 ..... RED | HATCHING 2 ..... RED |
| INDEX ..... BLUE | INDEX ..... LIGHT BLUE | INDEX ..... PURPLE |
| TINT PRINT ..... BLUE | TINT PRINT ..... LIGHT BLUE | TINT PRINT ..... PURPLE |
| BACKGOUND PRINT ..... BLUE | BACKGOUND PRINT ..... LIGHT BLUE | BACKGOUND PRINT ..... PURPLE |

| CHECK BLOCK | PRINT COLOR DESIGNATION CONDITION |
|---|---|
| | ---------- #1 |
| | ---------- #2 |
| | ---------- #3 |
| | ---------- #4 |

MERGED IMAGE PRINT OUT SYSTEM AND METHOD THEREFOR

BACKGROUND OF THE INVENTION

1. Field of the Invention

The present invention relates to an image output system and method capable of changing an image to be output based on information to be output.

2. Description of the Related Art

There is a known system which defines a predetermined form by using a form defining program in order to print data (print data), prepared by an application program, on a sheet of paper in that form. This system generally overlays print data on a predefined form. Since this system can alter the form using the form defining program, it can well be adapted to general purpose usages and is thus widely used as a business system.

According to this system, ruled lines, underlines and the like are printed in desired colors by properly altering the set contents of a printer analyzing program or the set contents of a printer driver or the like of a host computer by using the form defining program. This feature can allow users to easily grasp the contents of data printed on a sheet of paper and to easily manage printouts.

To designate the colors of ruled lines, underlines and the like, users should change the set contents of the printer analyzing program, the printer driver or the like printout by printout using the form defining program. Such alteration of set contents demands the users of troublesome works.

To emphasize particularly important information in print data, the convention system can also change the color of an area for the print data. In this case too, however, users must change the set contents of the printer analyzing program, the printer driver or the like in accordance with the contents of the print data by using the form defining program. This alteration of set contents demands the users of tiresome works.

If the set contents of the printer analyzing program, the printer driver or the like are not altered in order to avoid tiresome works, users cannot easily manage individual printouts or grasp the contents of each printout. The above shortcomings stand in the way of efficient business works.

SUMMARY OF THE INVENTION

Accordingly, it is an object of the present invention to provide an image output system and method which can easily distinguish output images and can allow a user to easily grasp the contents of the images.

To achieve the above object, a merged image print out system according to the first aspect of this invention comprises:

form defining information preparing means for preparing form defining information for generating a predetermined form;

textual content information generation means for generating textual content information to be merged into said predetermined form;

area designation means for designating a specific area in said predetermined form;

identifying means for identifying specific textual content information in said textual content information which is to be merged into the designated specific area;

alteration rule defining means for defining an alteration rule for said form defining information corresponding to said specific textual content information;

print attribution altering means for selecting said alteration rule corresponding to said specific textual content information identified by said alteration rule defining means, and for altering print attribution of said form defining information based on said selected alteration rule; and merged image printing means for generating print image information in which said form defining information having said altered print attribution and said textual content information are merged together based on said form defining information and said textual content information, and for printing out said generated print image information.

According to this image output system, the image of the predetermined form is altered in accordance with the contents of data to be output in the area which is designated by the area designation means. This makes it easier for a user to distinguish individual images and grasp the contents of each image.

In the above image output system, the merged image printing means may have print means for merging the image based on the textual content information into a image based on the form defining information and for printing the merged image on a sheet-like recording medium.

In the above merged image print out system the form defining information may include information for designating a color of the predetermined form; and the print attribution altering means may alter the information for designating the color of the predetermined form to change the color of the predetermined form.

In the above merged image print out system, the form defining information may include an index to be formed in a part of an image to be output and information for designating a color of the index; and the print attribution altering means may alter the information for designating the color of the index to change the color of the index to be printed.

In the above merged image print out system, the form defining information may include an index to be formed in a part of an image to be output and information for designating a position where the index is formed; and the print attribution altering means may alter the information for designating the position of the index to change a print position of the index.

In the above merged image print out system, the form defining information may include a background image to be output on a background of the image based on the textual content information generated by the textual content information generation means, and information for designating a color of the background image; and the print attribution altering means may alter the information for designating the color of the background image to change the color of the background image.

In the above merged image print out system, the form defining information may include a tint to be output on a background of the image based on the textual content information generated by the textual content information generating means, and information for designating a pattern of the tint; and the print attribution altering means may alter the information for designating the pattern of the tint to change the pattern of the tint.

A merged image print out system according to the second aspect of this invention comprises:

form defining information preparing means for preparing form defining information for generating a predetermined form;

textual content information generation means for generating textual content information to be merged into said predetermined form;

area designation means for designating a specific area in said predetermined form;

identifying means for identifying specific textual content information in said textual content information which is to be merged into the designated specific area;

alteration rule defining means for previously defining an alteration rule for said specific textual content information;

print attribution altering means for selecting said alteration rule for said specific textual content information, and for altering print attribution of said form defining information based on said selected alteration rule; and merged image printing means for generating print image information in which said form defining information and said textual content information having said altered print attribution are merged together based on said form defining information and textual content information, and for printing out said generated print image information.

According to this merged image print out system, the image of the textual content information that has been generated by the textual content information generation means is altered in accordance with the contents of data to be output in the area which is designated by the area designation means. This makes it easier for a user to distinguish individual images and grasp the contents of each image.

In this merged image print out system, the merged image printing means may have print means for merging the image of the textual content information into an image based on the form defining information, and for printing the merged image on a sheet-like recording medium.

In the above merged image print out system, the predetermined form may be a spreadsheet;

the textual content information generated by the textual content information generation means may include color designation information for designating colors of the spreadsheet row by row or column by column;

the area designation means may designate a specific cell in a row or a column of the spreadsheet; and the print attribution altering means may alter the color designation information to change the colors of the spreadsheet row by row or column based on the alteration rule textual content in the specific cell selected by the alteration rule defining means by column.

To achieve the aforementioned object, according to the third aspect of this invention, a method for outputting a merged image using a merged image print out system having textual content information generation means for generating textual content information to be printed out after being merged into a predetermined form generated on the basis of form defining information which is previously prepared by form defining information preparing means, merged image print out means for merging an image based on said textual content information generated by said textual content information generation means into an image of said predetermined form and for outputting the merged image, and alteration rule defining means for previously defining an alteration rule for said form corresponding to specific textual content information, comprises the steps of:

an area designation step of designating a specific area in said predetermined form;

a textual content information identifying step of controlling said alteration rule defining means to identify content of said textual content information in said textual content information generated by said textual content information generation means, which is to be output after being merged into said specific area designated by said area designation step, and to select said alteration rule corresponding to the identified content of said textual content information;

an image alteration step of altering said image of said predetermined form in accordance with said alteration rule selected by said textual content information identifying step; and an image output step of merging said image of said textual content information generated by said textual content information generation means into said image of said predetermined form changed by said image alteration step, and outputting the merged image.

According to the fourth aspect of this invention, a method for outputting a merged image using a merged image print out system having textual content information generation means for generating textual content information to be printed out after being merged into a predetermined form generated on the basis of form defining information which is previously prepared by form defining information preparing means, merged image print out means for merging an image based on said textual content information generated by said textual content information generation means into an image of said predetermined form and for outputting the merged image, and alteration rule defining means for previously defining an alteration rule for said textual content information corresponding to specific textual content information, comprises the steps of:

an area designation step of designating a specific area in said predetermined form;

a textual content information identifying step of controlling said alteration rule defining means to identify content of said textual content information in said textual content information generated by said textual content information generation means, which is to be output after being merged into said specific area designated by said area designation step, and to select said alteration rule corresponding to the identified content of said textual content information;

an image alteration step of altering said image of said textual content information generated by said textual content information generation means in accordance with said alteration rule selected by said textual content information identifying step; and an image output step of merging said image of said textual content information changed by said image alteration step into said image of said predetermined form, and outputting the merged image.

an image output step of synthesizing the image of the data changed by the image alteration step and the image of the predetermined form, and outputting a synthesized image.

BRIEF DESCRIPTION OF THE DRAWINGS

FIG. 5A is a diagram exemplifying a color conversion table of a palette type which is stored in a color conversion table section in the printing system in FIG. 4;

FIG. 5B is a diagram exemplifying a color conversion table of an individual color designation type which is stored in the color conversion table section in the printing system in FIG. 4;

FIG. 6 is a diagram showing an example of a specific data value color table which is stored in the color conversion table section in the printing system in FIG. 4;

FIGS. 7A and 7B are diagrams exemplifying the classification of data using wild cards in a color selector shown in FIG. 4;

FIG. 11 is a diagram showing an example of a color table provided in a color selector in the printing system in FIG. 10;

FIG. 18A is a diagram showing an example of a specific data value color table according to a modification of this invention;

FIG. 18B is a diagram exemplifying a color conversion table section corresponding to the specific data value color table in FIG. 18A;

DETAILED DESCRIPTION OF THE PREFERRED EMBODIMENTS

Preferred embodiments of the present invention will now be described with reference to the accompanying drawings.

First Embodiment

Figure 1:
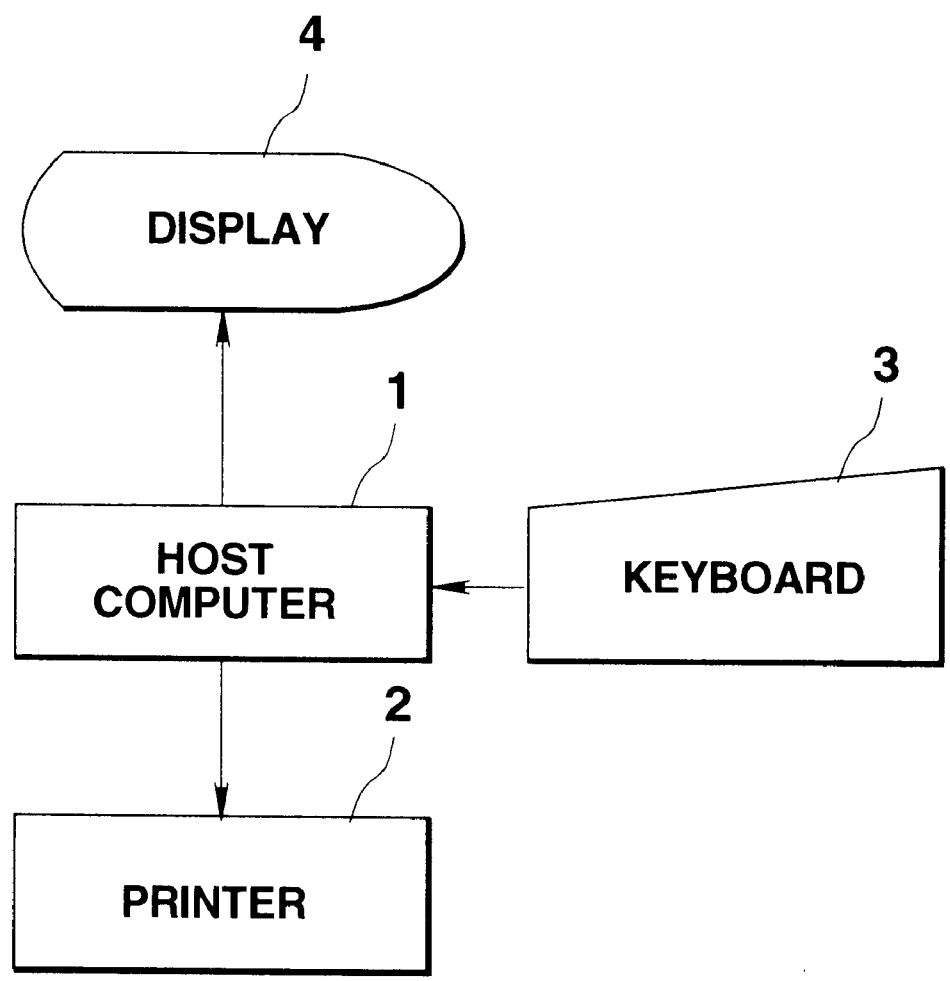
FIG. 1 is a block diagram illustrating the structure of a printing system according to the first embodiment of this invention.

FIG. 1 presents a block diagram illustrating the structure of a printing system to which this invention is adapted.

As illustrated, this printing system comprises a host computer 1, a printer 2, a keyboard 3 and a display 4.

The host computer 1 includes a CPU (Central Processing Unit), a main memory and a hard disk unit. The host computer 1 accomplishes various functions, which will be discussed later, by transferring processing programs, written in the hard disk unit, to the main memory and causing the CPU to sequentially execute the processing programs.

The printer 2 is connected to the host computer 1. The printer 2 develops an image of data, transferred from the host computer 1, into a frame memory and prints the developed image on a sheet of paper. The printer 2, which operates independently of the host computer 1, has the functions which will be discussed later. The printer 2 supports at least one of two color designation systems, namely a palette system or an individual color designation system, for printing an image in color.

The keyboard 3, connected to the host computer 1, is used to input data of a text generated by an application program to be discussed later, and to give operational instructions for the host computer 1. The display 4, also connected to the host computer 1, displays a text prepared by the host computer 1.

Figure 2:
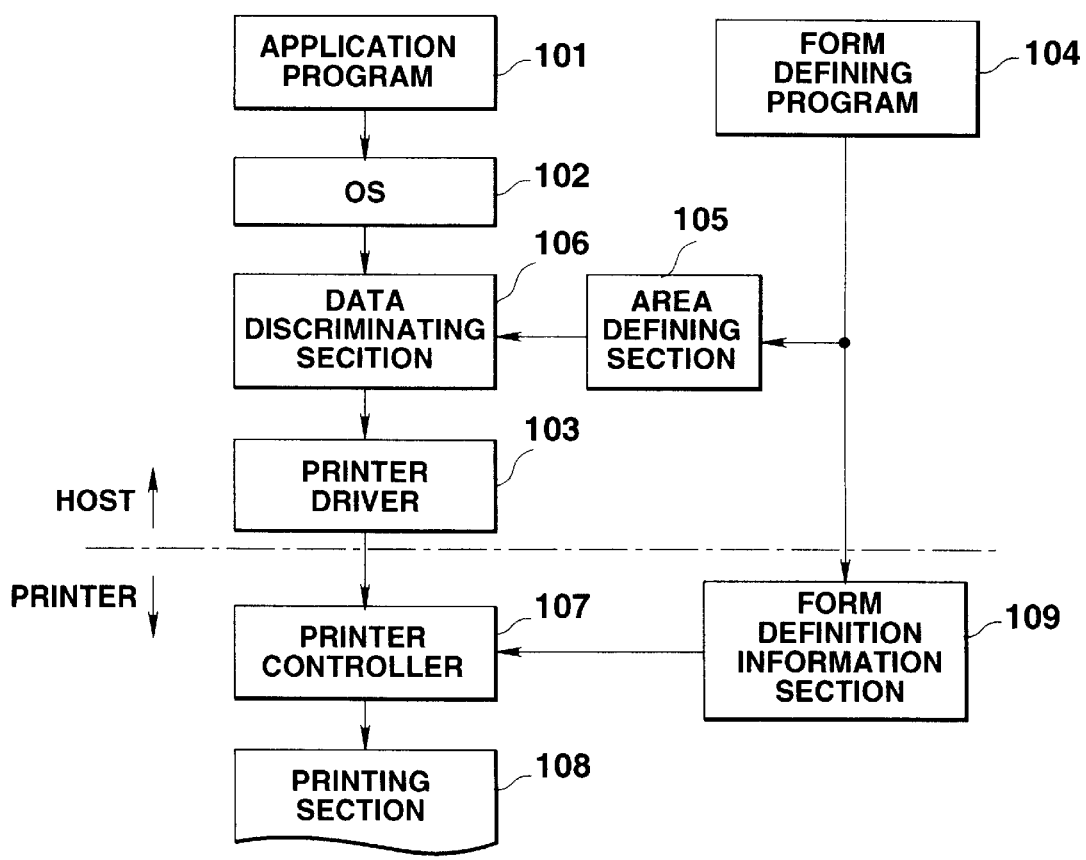
FIG. 2 is a functional block diagram of the printing system according to the first embodiment of this invention.

This printing system accomplishes the functions that are illustrated in the functional block diagram of FIG. 2. In this printing system, the host computer 1 comprises an application program 101, an operating system (OS) 102, a printer driver 103, a form defining program 104, an area defining section 105, and a data discriminating section 106. The printer 2 comprises a printer controller 107, a printing section 108 and a form definition information section 109.

The application program 101 operates on the OS 102. The application program 101 is a general-purpose program for business usages, which is written in a language like COBOL. A user inputs data for business works (e.g., business office names, product names, sales, etc.) through the keyboard 3 in accordance with the application program 101. The application program 101 processes the input data and prepares data for printing the processed data on a sheet of paper (the latter data will be hereinafter called "print data"). The print data includes control codes, such as a carriage return (line feed) code and a page feed code, besides character codes.

The OS 102 receives print data generated by the application program 101 and sends it to the data discriminating section 106 character by character (including a control code).

The form defining program 104 generates form definition information for defining a form for printing the print data, prepared by the application program 101, in accordance with an instruction given through the keyboard 3. In response to an instruction from the keyboard 3, the form defining program 104 designates special modification information for printing special information, such as the background, an index or a tint, and color designation information or the like for printing an image in a specific color.

As will be described later, the form defining program 104 also designates the item of data which is in the print data, generated by the application program 101 by an instruction given through the keyboard 3, and which is for changing the color of an image to be printed. This image-color changing data is data in a specific item in the form (hereinafter called "specific data item").

Figure 3:
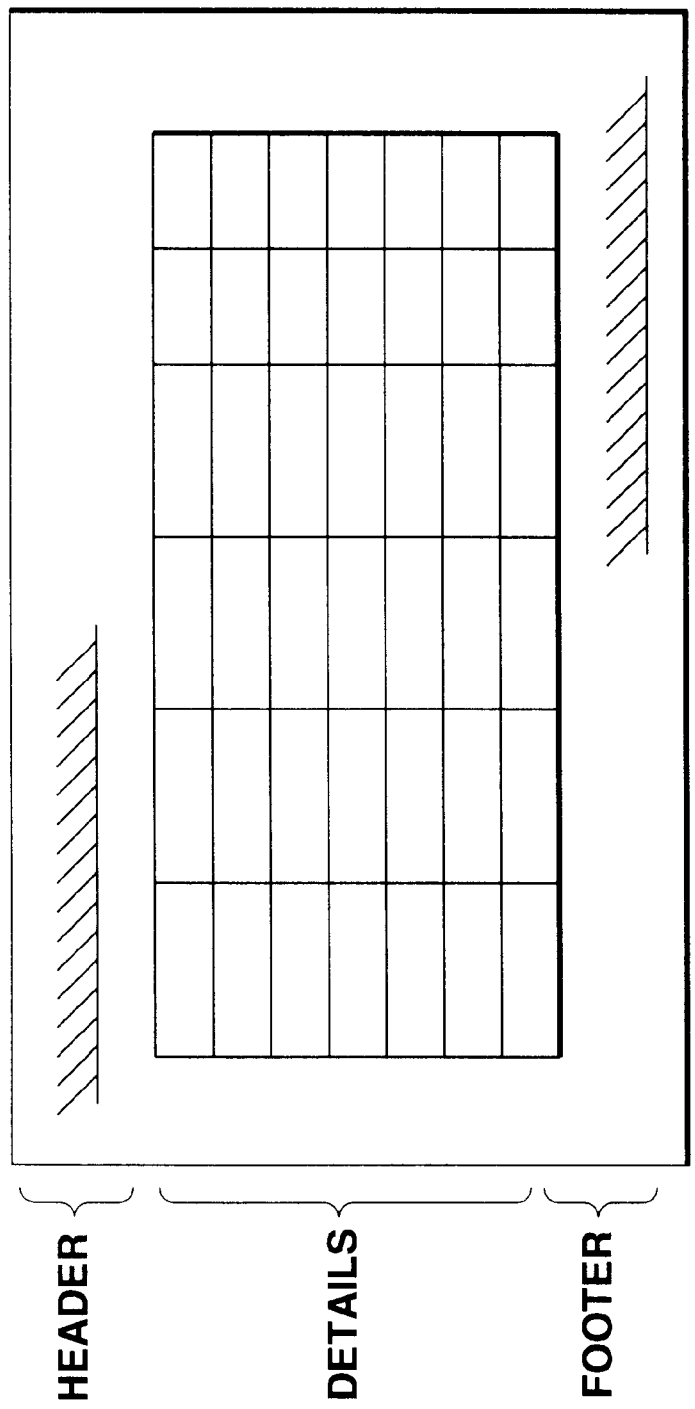
FIG. 3 is a diagram exemplifying a spreadsheet form which is generated by a form defining program of the printing system in FIG. 2.

In this embodiment, a form prepared by the form defining program 104 is a spreadsheet, which consists of a header, a details part and a footer as shown in FIG. 3. Described in the header is data per spreadsheet, such as the name of a business office. Described in the details part is a list which shows the details of the information written in the header, such as product names and sales. Auxiliary information is written in the footer. In processes to be discussed later, the contents of the header may be treated as a specific data item.

In response to an instruction given through the keyboard 3, the form defining program 104 designates color designation (color mode status) of either a palette type or an individual color designation type to match with the color designation system in the printer 2.

The information, such as form definition information, which is prepared or designated by the form defining program 104 is sent to the area defining section 105 or the form definition information section 109 of the printer 2.

The area defining section 105 stores the form definition information generated by the form defining program 104, the specific data item and the color mode status, both designated by the form defining program 104.

The data discriminating section 106 generates a color control command (which will be discussed later) from the print data received from the OS 102 by referring to the specific data item stored in the area defining section 105. The data discriminating section 106 supplies the print data received from the OS 102, the color mode status read from the area defining section 105, and the generated color control command to the printer driver 103.

The structure of the data discriminating section 106 will be described more specifically.

The printer driver 103 sends the print data, color mode status and color control command, sent from the data discriminating section 106, to the printer controller 107 of the printer 2.

The form definition information section 109 stores the form definition information, special modification information and color designation information, all generated by the form defining program 104.

The printer controller 107 generates image data of a bit map pattern based on the print data sent from the printer driver 103 and the form definition information (including special modification information and color designation information) stored in the form definition information section 109. The image data generated by the printer controller 107 is sent to the printing section 108.

The structure of the printer controller 107 will be discussed more specifically.

The printing section 108 transfers toners in four colors of yellow, magenta, cyan and black on a sheet of paper by an electrophotography technique, so that an image corresponding to the image data received from the printer controller 107 is formed on the paper.

Figure 4:
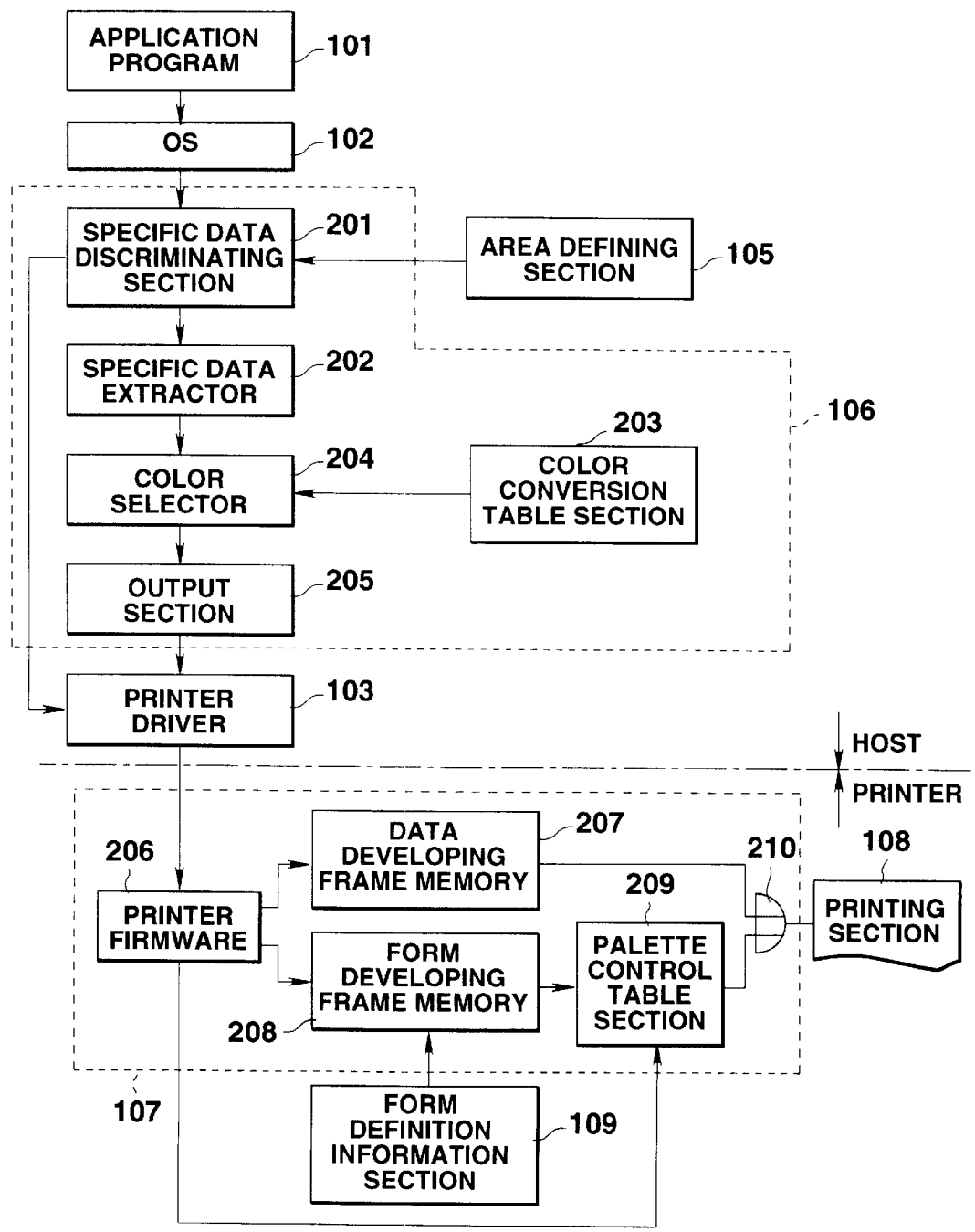
FIG. 4 is a functional block diagram showing the detailed structures of a data discriminating section and a printer controller in the printing system in FIG. 2.

The structures of the data discriminating section 106 and the printer controller 107 will now be described referring to FIG. 4.

As illustrated, the data discriminating section 106 comprises a specific data discriminating section 201, a specific data extractor 202, a color conversion table section 203, a color selector 204 and an output section 205.

The specific data discriminating section 201 discriminates if the print data received character by character from the OS 102 is data of a specific data item by referring to the form definition information and information designating the specific data item, both stored in the area defining section 105. The print data that is discriminated as data of a specific data item by the specific data discriminating section 201 is sent to the specific data extractor 202. On the other hand, the print data that is not discriminated as data of a specific data item by the specific data discriminating section 201 is sent to the printer driver 103.

The specific data extractor 202 saves the print data which has been discriminated as data of a specific data item by the specific data discriminating section 201. The print data saved by the specific data extractor 202 is sent to the color selector 204 when all data of the specific data item are saved.

The color conversion table section 203 has color conversion tables for changing the color of an image to be printed on a sheet of paper, in association with the palette type color designation and the individual color designation.

The color conversion table for the palette type can permit the designation of eight kinds of colors as shown in FIG. 5A in which numerals in parenthesis respectively indicate the eight colors. This color conversion table is referred to according to a color table number which will be discussed later. Based on the contents of the color conversion table referred to according to the color table number, a color control command indicating the conversion correlation of colors is generated.

The color conversion table for the individual color designation type can permit the designation of 64 kinds of colors as shown in FIG. 5B which are respectively assigned with numerals from "1" to "64." This color conversion table is referred to according to a color table number which will be discussed later. Based on the contents of the color conversion table referred to according to the color table number, a color control command indicating the correlation of color conversion is generated. The individual 64 colors are acquired by mixing four colors of yellow, magenta, cyan and black at predetermined ratios.

The color selector 204 reads data of a specific data item saved in the specific data extractor 202, and generates a color table number for designating a color table in accordance with the contents of the read data. The color selector 204 has a table as shown in FIG. 6 based on which it generates color table numbers.

The color selector 204 generates a color control command indicating the conversion correlation of colors of a form to be printed on paper. The generated color control command is supplied to the output section 205.

The color selector 204 discriminates the data contents of a specific data item using wild cards as shown in FIGS. 7A and 7B.

The output section 205 reads the color mode status from the area defining section 105 via the specific data discriminating section 201, the specific data extractor 202 and the color selector 204. This output section 205 sequentially outputs this color mode status and the color control command and print data, both supplied from the color selector 204.

The printer controller 107 comprises a printer firmware 206, a data developing frame memory 207, a form developing frame memory 208, a palette control table section 209 and an OR gate 210.

The printer firmware 206 receives the color mode status, the color control command and the print data from the output section 205. The printer firmware 206 sends the print data to the data developing frame memory 207. The printer firmware 206 supplies the received color mode status and color control command to the form developing frame memory 208. The printer firmware 206 supplies the received color control command to the palette control table section 209. Based on a page feed code included in the print data, the printer firmware 206 generates a print start signal for outputting image data from the OR gate 210. This print start signal is supplied to the data developing frame memory 207 and the palette control table section 209.

The data developing frame memory 207 and the form developing frame memory 208 each have memories for respectively developing images in yellow, magenta, cyan and black.

Image data corresponding to the print data supplied from the printer firmware 206 is developed in a bit map form in the data developing frame memory 207.

The image of the form is developed in a bit map form in the form developing frame memory 208 based on the form definition information (including the special modification information and color designation information) stored in the form definition information section 109. The development scheme for an image into the form developing frame memory 208 differs depending on the color designation type as will be discussed later. The image developing scheme is identified by the color mode status.

A table corresponding to the color control command supplied from the printer firmware 206 is set in the palette control table section 209. When the individual color designation type is designated by the color mode status, a standard color table for outputting the image data, developed in the form developing frame memory 208 in its original color, is set in the palette control table section 209.

The image data developed in the data developing frame memory 207 is output in accordance with the print start signal. The image data developed in the form developing frame memory 208 is output via the palette control table section 209 in accordance with the print start signal. The image data of the print data and the image data of the form are synchronously output so that image data of the same color and at the same position are simultaneously supplied to the OR gate 201.

The OR gate 210 synthesizes the image data of the print data output from the data developing frame memory 207 and the image data of the form output from the palette control table section 209, and outputs the resultant image data to the printing section 108.

The operation of this embodiment will be described below with reference to the flowcharts in FIGS. 8 and 9.

A user first activates the application program 101 and inputs data for a business work through the keyboard 3. The application program 101 performs a predetermined process on the entered data to generate print data.

The print data produced by the application program 101 is supplied via the OS 102 to the data discriminating section 106.

The user then activates the form defining program 104 and makes predetermined inputs through the keyboard 3 in accordance with this form defining program 104 to generate form definition information. In accordance with the form defining program 104, the user designates color designation information or the like, and designate a specific data item. When any already generated form is to be used, however, the processing by the form defining program 104 is unnecessary.

The data generated or designated by the form defining program 104 is stored in the area defining section 105 and the form definition information section 109 of the printer 2, as mentioned above.

In the printer 2, image data corresponding to the form definition information (including special modification information and color designation information) stored in the form definition information section 109 is developed in a bit map form in the form developing frame memory 208.

Figure 8:
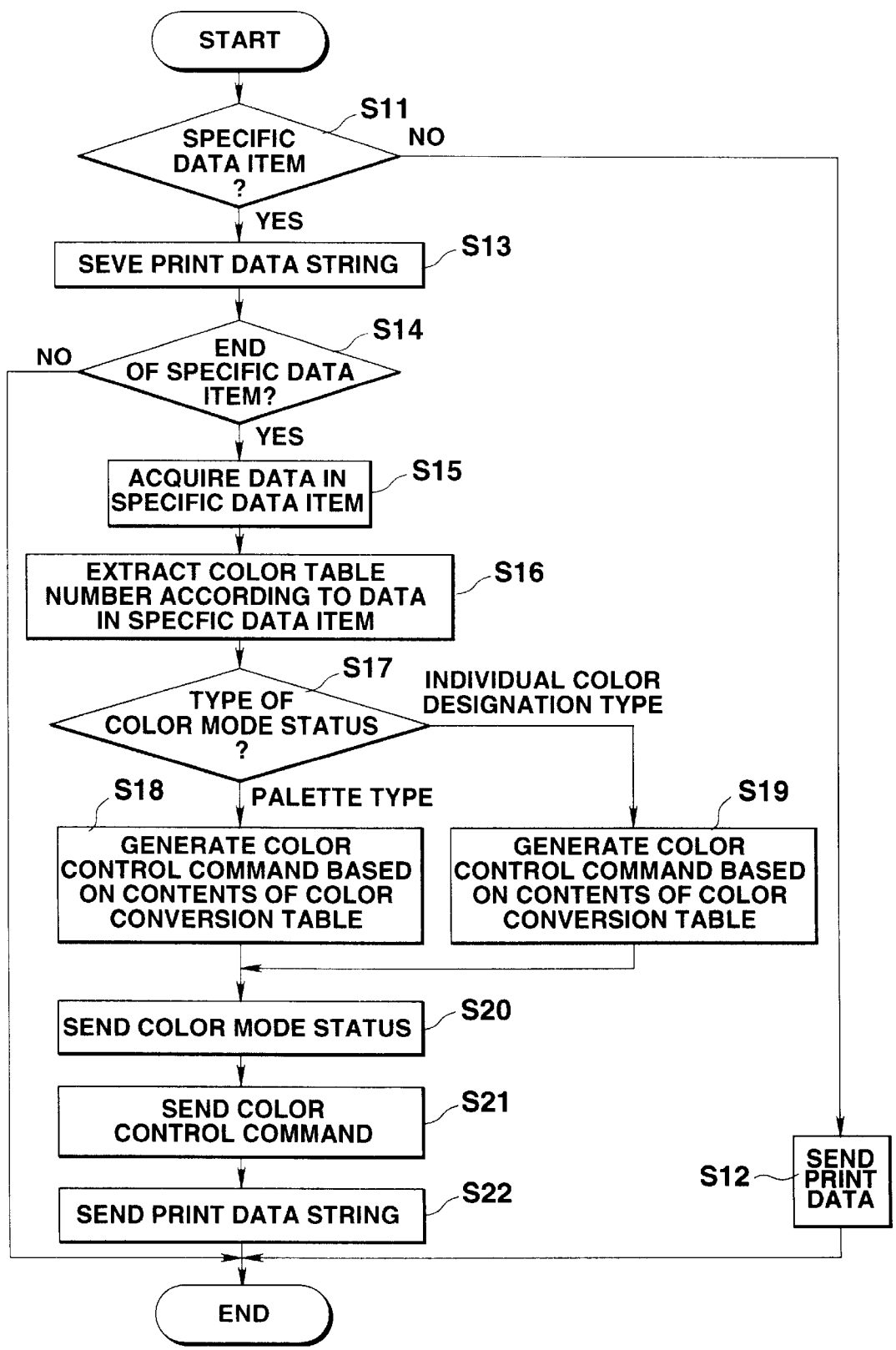
FIG. 8 is a flowchart illustrating a sequence of processes to be executed in the data discriminating section according to the first embodiment of this invention.

FIG. 8 is a flowchart illustrating a sequence of processes which is executed in the data discriminating section 106. The processing in this flowchart starts every time the data discriminating section 106 receives one character (including a control code) of print data from the OS 102.

When the flow starts, the specific data discriminating section 201 refers to the form definition information and specific data item stored in the area defining section 105 and discriminates if the received print data is data of a specific data item (step S11).

When the specific data discriminating section 201 does not discriminate in step S11 that the received print data is data of the specific data item, that print data is sent to the printer driver 103 (step S12). Then, the processing in this flowchart will be terminated.

When the specific data discriminating section 201 discriminates in step S11 that the received print data is data of the specific data item, the received print data is sent to the specific data extractor 202 to be saved there (step S13).

Next, the specific data discriminating section 201 discriminates if the received print data is data indicative of the end of the specific data item based on a control code indicating that the received print data is the end of data (step S14).

When it is not discriminated in step S14 that the received print data indicates the end of the specific data item, the processing in this flowchart will be terminated.

When it is discriminated in step S14 that the received print data indicates the end of the specific data item, the flow goes to a process by the color selector 204.

First, the color selector 204 acquires data of a portion, which is necessary to read a color conversion table stored in the color conversion table section 203, from the print data saved in the specific data extractor 202 (step S15). The reason why only partial data is acquired here is because a wild card can be used as shown in FIG. 7.

The color selector 204 then extracts a color table number from the internal table in accordance with the data of the specific data item which has partially been acquired in step S15 (step S16).

Then, the color selector 204 reads the color mode status from the area defining section 105 via the specific data discriminating section 201 and the specific data extractor 202. It is then determined if this color mode status is for the palette type or the individual color designation type (step S17).

When it is determined in step S17 that the color mode status is for the palette type, the color conversion table for the palette type is referred to based on the color table number. Based on the contents of the referred color conversion table, the color selector 204 generates a color control command (step S18).

When it is determined in step S17 that the color mode status is for the individual color designation type, the color conversion table for the individual color designation type is referred to based on the color table number. Based on the contents of the referred color conversion table, the color selector 204 generates color control command (step S19).

When the color control command is generated either in step S18 or step S19 and is sent to the output section 205, the flow goes to a process by the output section 205.

The output section 205 reads the color mode status from the area defining section 105 via the specific data discriminating section 201, the specific data extractor 202 and the color selector 204. Then, the output section 205 sends the read color mode status to the printer driver 103 (step S20).

Next, the output section 205 reads the color control command generated by the color selector 204 and sends it to the printer driver 103 (step S21).

Then, the output section 205 reads the print data, saved in the specific data extractor 202, via the color selector 204. The output section 205 sends the read print data to the printer driver 103 (step S22).

Then, the processing in this flowchart will be terminated.

Through the sequence of processes in the flowchart in FIG. 8, the color mode status, color control command and print data, sent from the data discriminating section 106, are sequentially sent to the printer controller 107 of the printer 2 via the printer driver 103.

Figure 9:
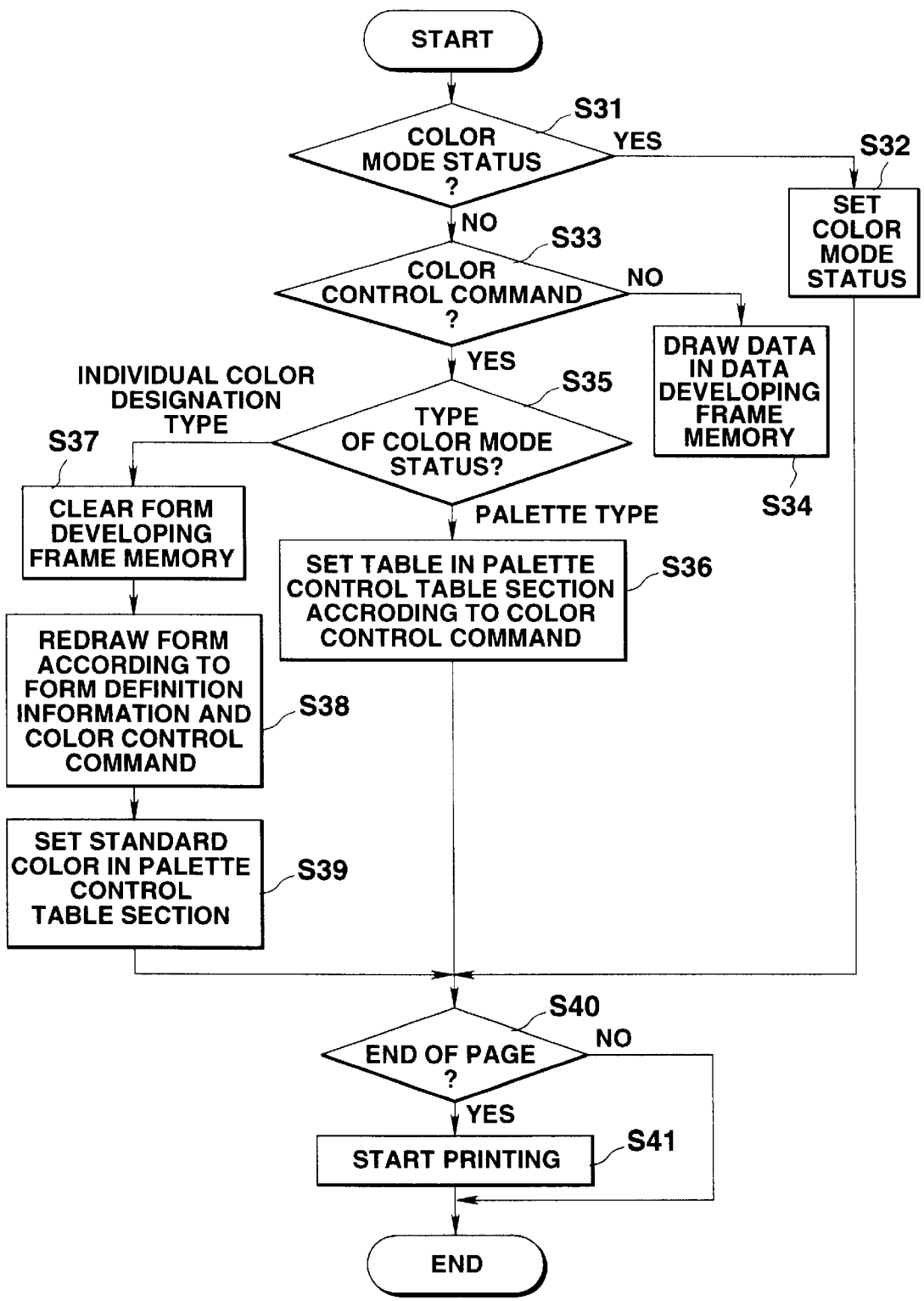
FIG. 9 is a flowchart illustrating a sequence of processes to be executed in the data printer controller according to the first embodiment of this invention.

FIG. 9 presents a flowchart illustrating a sequence of processes to be executed in the printer controller 107, particularly in the printer firmware 206.

The processing in this flowchart starts every time the printer controller 107 receives one character (including a control code) of print data, the color mode status or the color control command from the printer driver 103 of the host computer 1.

When the flow starts, it is discriminated if the received data is the color mode status (step S31).

When it is discriminated in step S31 that the received data is the color mode status, the color mode status is set in a predetermined memory in the printer 2 (step S32) after which the flow proceeds to step S40. The setting of the color mode status in step S32 is executed only when the printer 2 supports both the palette type color designation and the individual color designation. When the printer 2 supports only one of the color designation types, the flow goes to step S40 without setting the color mode status.

When it is not discriminated in step S31 that the received data is the color mode status, it is determined if the received data is the color control command (step S33).

When it is not determined in step S33 that the received data is the color control command, the received data is print data. In this case, image data corresponding to the print data is developed in the data developing frame memory 207 (step S34) after which the flow proceeds to step S40. When the print data is a control code, the flow proceeds to step S40 without developing the image data in the frame memory 207.

When it is determined in step S33 that the received data is the color control command, it is determined whether the color mode status is for the palette type color designation or for the individual color designation. This discrimination of the type of the color mode status is performed based on the color mode status set in step S32 when the printer 2 supports both color designation types or based on the color mode status inherently set to the printer 2 when the printer 2 supports only one color designation type (step S35).

When it is determined in step S35 that the color mode status is for the palette type color designation, the table which corresponds to the received color control command is set in the palette control table section 209 (step S36). The flow then proceeds to step S40. When the color mode status is for the palette type color designation, as apparent from the above, the color of the image of the form developed in the form developing frame memory 208 is changed in accordance with the table set in the palette control table section 209.

When it is determined in step S35 that the color mode status is for the individual color designation, the form developing frame memory 208 is cleared (step S37).

Next, image data corresponding to the form definition information (including special modification information and color designation information) stored in the form definition information section 109 is developed in the form developing frame memory 208 after its color is altered according to the received color control command (step S38).

Then, the table which indicates the standard color is set in the palette control table section 209 (step S39) after which the flow proceeds to step S40. When the color mode status is for the individual color designation, as apparent from the above, the image of the form is redrawn in the form developing frame memory 208 with the changed color.

In step S40, it is determined whether or not one page of data is ended by checking if the received data is a page feed code in the print data.

When it is not determined in step S40 that it is the end of one page of data, the processing in this flowchart will be terminated directly.

When it is determined in step S40 that it is the end of one page of data, the print start signal is sent to the data developing frame memory 207 and the palette control table section 209 (step S41). The OR gate 210 synthesizes the image data output from the data developing frame memory 207 and the image data output from the palette control table section 209. Accordingly, image data acquired by synthesizing the image data of the print data developed in the data developing frame memory 207 and the image data of the form developed in the form developing frame memory 208 is supplied to the printing section 108. The processing in this flowchart will then be terminated.

When image data is supplied to the printing section 108 through the sequence of processes in the flowchart in FIG. 9, the printing section 108 forms an image corresponding to that image data on a sheet of paper.

The alteration of the color of the form through the above-described processing will now be discussed specifically for both the palette type color designation and the individual color designation.

Suppose that the color selector 204 has generated a color table number 1 according to the contents of data of a specific data item in the palette type color designation. In this case, a spreadsheet output has its color changed to a color different from the one designated by the form defining program 104, e.g., the color of the portion designating yellow is changed to magenta, the color of the portion designating magenta is changed to cyan and so forth.

If a color table number 2 has been generated for another spreadsheet in accordance with the contents of the data of a specific data item, the color of the portion designating yellow is changed to cyan, the color of the portion designating magenta is changed to black and so forth.

Suppose that the color selector 204 has generated a color table number 3 according to the contents of data of a specific data item in the individual color designation. In this case, a spreadsheet output has its color changed in such a way that the color of the portion designating a color designation number 1 is changed to the color of number 17 and the color of the portion designating a color designation number 2 is changed to the color of number 18. According to the printing system of this embodiment, as described above, the forms of different spreadsheets can be printed in different colors based on the contents of print data generated by the application program 101. This allows the user to easily classify printed spreadsheets without involving tiresome works.

Second Embodiment

Figure 10:
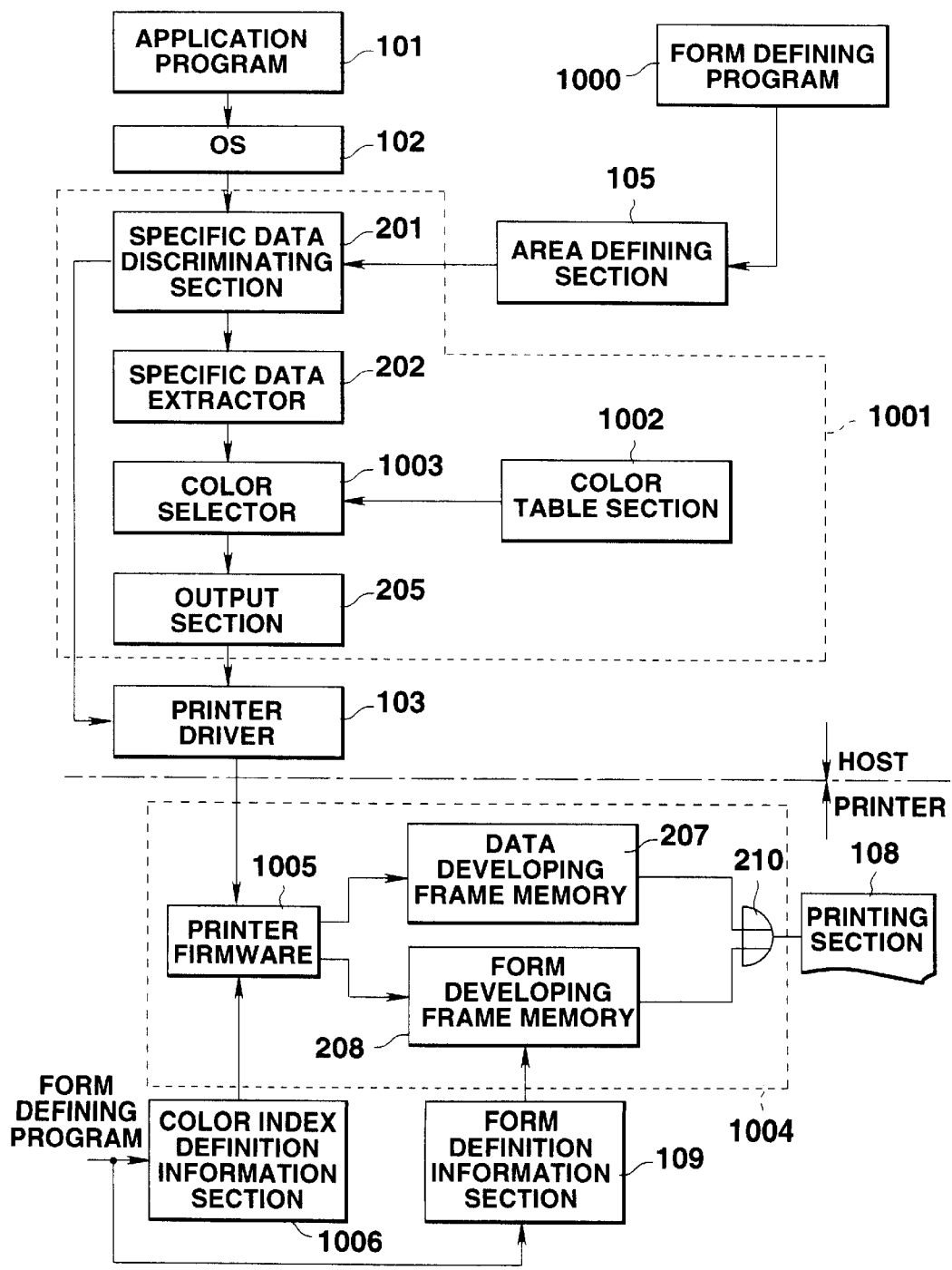
FIG. 10 is a functional block diagram of a printing system according to the second embodiment of this invention.

FIG. 10 is a functional block diagram of a printing system according to the second embodiment of this invention.

Like or same reference numerals are given to those components of the printing system of this embodiment which are the same as or identical to the corresponding components of the printing system of the first embodiment.

In the printing system of the second embodiment, a form defining program 1000 generates color index information for defining an index (which will be discussed later) in addition to form data. This color index information includes information which designates the area where an index is to be printed and the print color of the index.

The printer 2 has a color index definition information section 1006 which stores the color index information generated by the form defining program 1000. The printer 2 supports only the individual color designation.

A data discriminating section 1001 includes a color selector 1003 different from that of the first embodiment and a color table section 1002 in place of the color conversion table section 203.

A color table exemplified in FIG. 11 is stored in the color table section 1002. The color selector 1003 has a table similar to that of the color selector 204 of the first embodiment, and generates a color table number based on the contents of data of a specific data item. Based on the generated color table number, the color selector 1003 generates a color control command for changing the color of an index to be discussed later.

In a printer controller 1004, the output of the form developing frame memory 208 is directly supplied to the OR gate 210. A printer firmware 1005, which differs from that of the first embodiment, develops the image data of an index in the form developing frame memory 208 by referring to the color index information stored in the color index definition information section 1006.

Figure 12A:
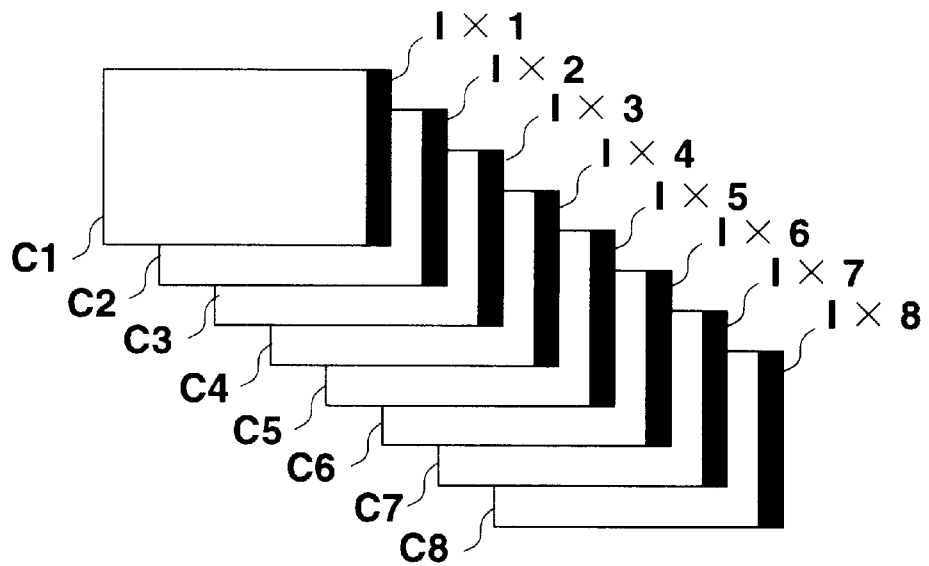
FIGS. 12A and 12B are diagrams exemplifying printed indexes according to the second embodiment of this invention.
Figure 12B:
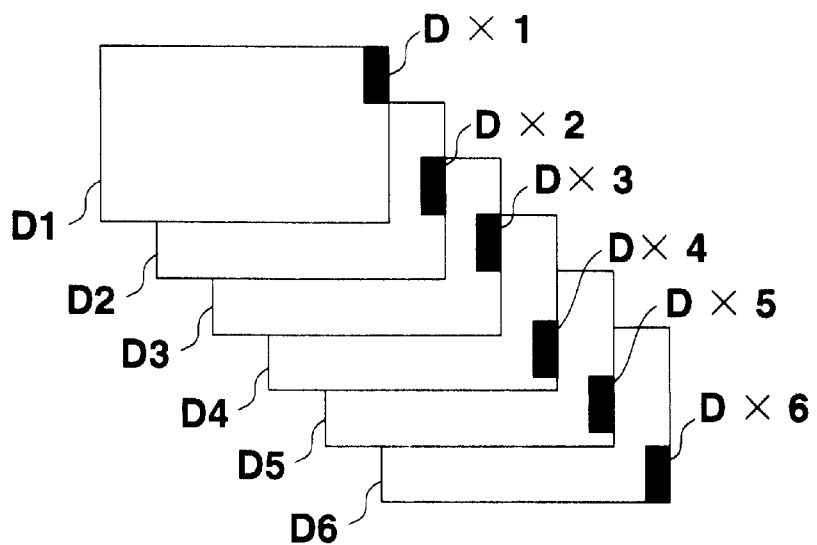

In this embodiment, an index is printed at an edge of paper. As shown in FIG. 12A, for example, indexes IX1 to IX8 can be printed fully at one edges of spreadsheets C1 to C8 or indexes DX1 to DX6 can be printed at one edges of spreadsheets D1 to D6 at different positions. It is to be noted that the colors of the indexes IX1–IX8 or the indexes DX1–DX6 differ from one another.

The operation of this embodiment will now be described with reference to the flowcharts in FIGS. 13 and 14.

In this embodiment, print data and form definition information are generated in the same manner as done in the first embodiment. The generated print data is supplied via the OS 102 to the data discriminating section 1001. The generated form definition information is stored in the area defining section 105 and the form definition information section 109.

In this embodiment, a user designates color index information in accordance with the form defining program 1000. This color index information is stored in the color index definition information section 1006.

Figure 13:
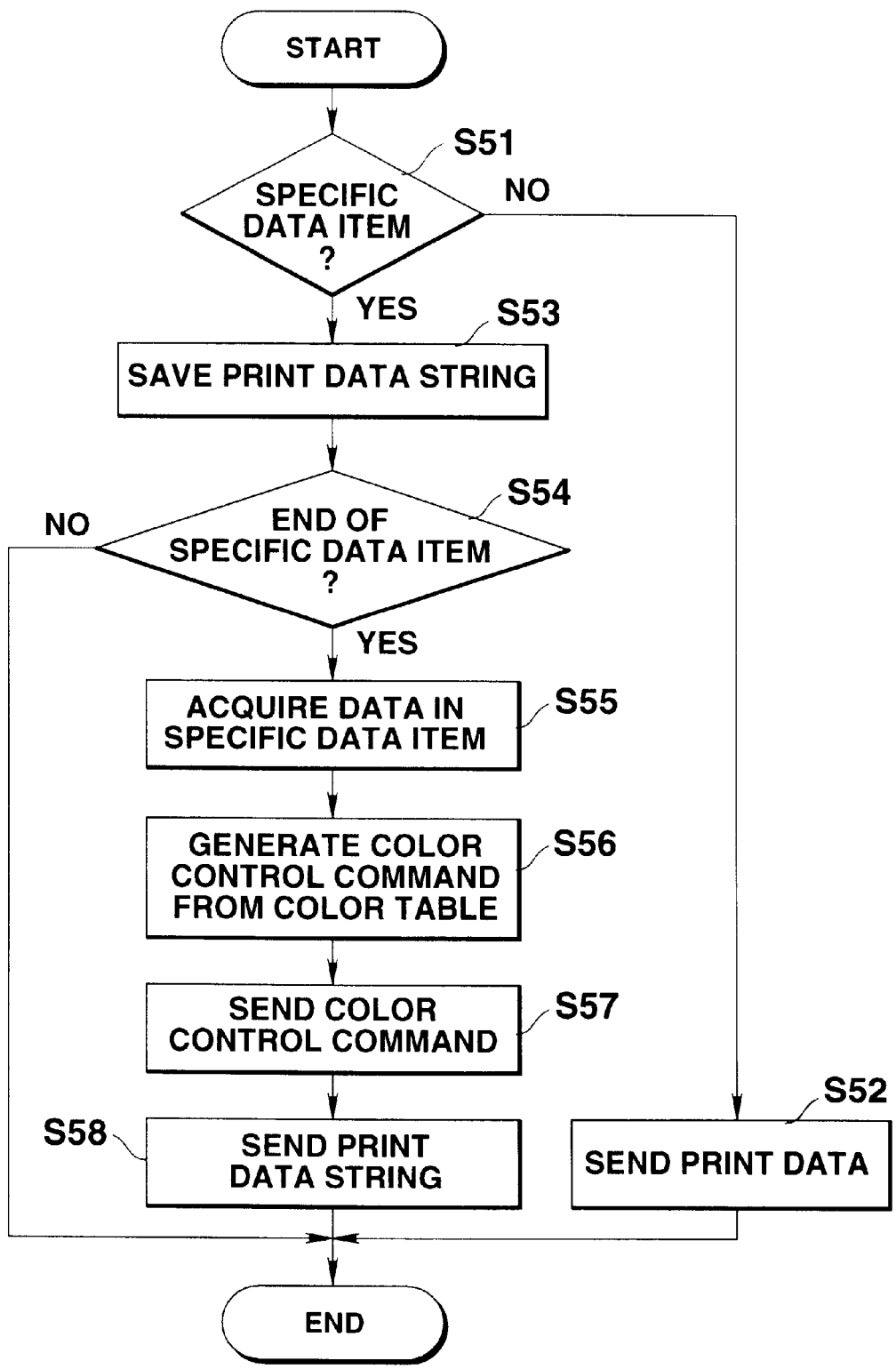
FIG. 13 is a flowchart illustrating a sequence of processes which is executed in a data discriminating section according to the second embodiment of this invention.

FIG. 13 is a flowchart illustrating a sequence of processes which is executed in the data discriminating section 1001. The processing in this flowchart starts every time the specific data discriminating section 201 receives one character (including a control code) of data from the OS 102.

When the flow starts, the specific data discriminating section 201 refers to the form definition information and specific data item stored in the area defining section 105 and discriminates if the received print data is data of a specific data item (step S51).

When the specific data discriminating section 201 does not discriminate in step S51 that the received print data is data of the specific data item, that print data is sent to the printer driver 103 (step S52). Then, the processing in this flowchart will be terminated.

When the specific data discriminating section 201 discriminates in step S51 that the received print data is data of the specific data item, the received print data is sent to the specific data extractor 202 to be saved there (step S53).

Next, the specific data discriminating section 201 discriminates if the received print data is data indicative of the end of the specific data item based on a control code indicating that the received print data is the end of data (step S54).

When it is not discriminated in step S54 that the received print data indicates the end of the specific data item, the processing in this flowchart will be terminated.

When it is discriminated in step S54 that the received print data indicates the end of the specific data item, the flow goes to a process by the color selector 1003.

First, the color selector 1003 acquires data of a portion, which is necessary to read a color table stored in the color table section 1003, from the print data saved in the specific data extractor 202 (step S55).

The color selector 1003 then extracts a color table number from the internal table in accordance with the data of the specific data item which has partially been acquired in step S55. Based on the extracted color table number, the color selector 1003 refers to the color table in the color table section 1002 and generates a color control command based on the contents of the referred color table (step S56).

When the color control command is generated in step S56 and is sent to the output section 205, the flow goes to a process by the output section 205.

The output section 205 sends the color control command from the color selector 1003 to the printer driver 103 (step S57).

Then, the output section 205 reads the print data, saved in the specific data extractor 202, via the color selector 1003. The output section 205 sends the read print data to the printer driver 103 (step S58).

Then, the processing in this flowchart will be terminated.

Through the sequence of processes in the flowchart in FIG. 13, the color control command and print data, read from the data discriminating section 1001, are sequentially sent to the printer controller 1004 of the printer 2 via the printer driver 103.

Figure 14:
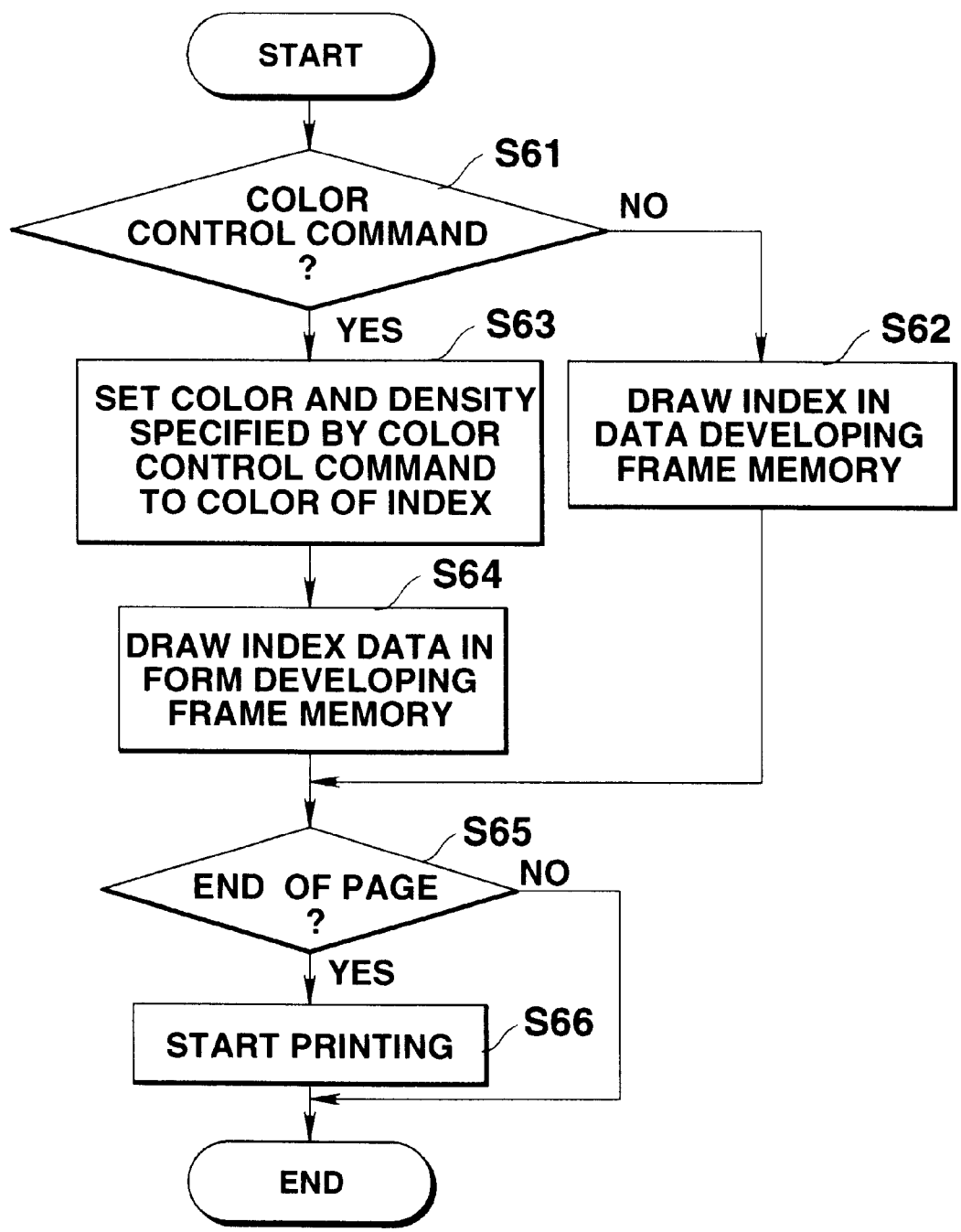
FIG. 14 is a flowchart illustrating a sequence of processes which is executed in a printer controller according to the second embodiment of this invention.

FIG. 14 presents a flowchart illustrating a sequence of processes to be executed in the printer controller 1004, particularly in the printer firmware 1005.

The processing in this flowchart starts every time the printer controller 1004 receives one character (including a control code) of print data or the color control command from the printer driver 103 of the host computer 1.

When the flow starts, it is discriminated if the received data is the color control command (step S61).

When it is not determined in step S61 that the received data is the color control command, the received data is print data. In this case, image data corresponding to the print data is developed in the data developing frame memory 207 (step S62) after which the flow proceeds to step S65. When the print data is a control code, the flow proceeds to step S65 without developing the image data in the frame memory 207.

When it is determined in step S61 that the received data is the color control command, the color and density according to the contents of the color control command are set as color information of an index in the printer firmware 1005 (step S63). Then, the color index information is read from the color index definition information section 1006, the color and density are changed to what is specified by the color information set in step S63, and the image data of the index is developed in the form developing frame memory 208 (step S64). The flow then proceeds to step S65.

In step S65, it is determined whether or not one page of data is ended by checking if the received data is a page feed code in the print data.

When it is not determined in step S65 that it is the end of one page of data, the processing in this flowchart will be terminated directly.

When it is determined in step S65 that it is the end of one page of data, the print start signal is sent to the data developing frame memory 207 and the form developing frame memory 208 (step S66). The OR gate 210 synthesizes the image data output from the data developing frame memory 207 and the image data output from the form developing frame memory 208. Accordingly, image data acquired by synthesizing the image data of the print data developed in the data developing frame memory 207 and the image data of the form developed in the form developing frame memory 208 is supplied to the printing section 108. The processing in this flowchart will then be terminated.

When image data is supplied to the printing section 108 through the sequence of processes in the flowchart in FIG. 14, the printing section 108 forms an image corresponding to that image data on a sheet of paper.

According to the printing system of this embodiment, as described above, the color of an index to be printed at one edge of each spreadsheet can be altered based on the contents of print data generated by the application program 101. This allows the user to easily classify printed spreadsheets without involving tedious works.

Third Embodiment

Figure 15:
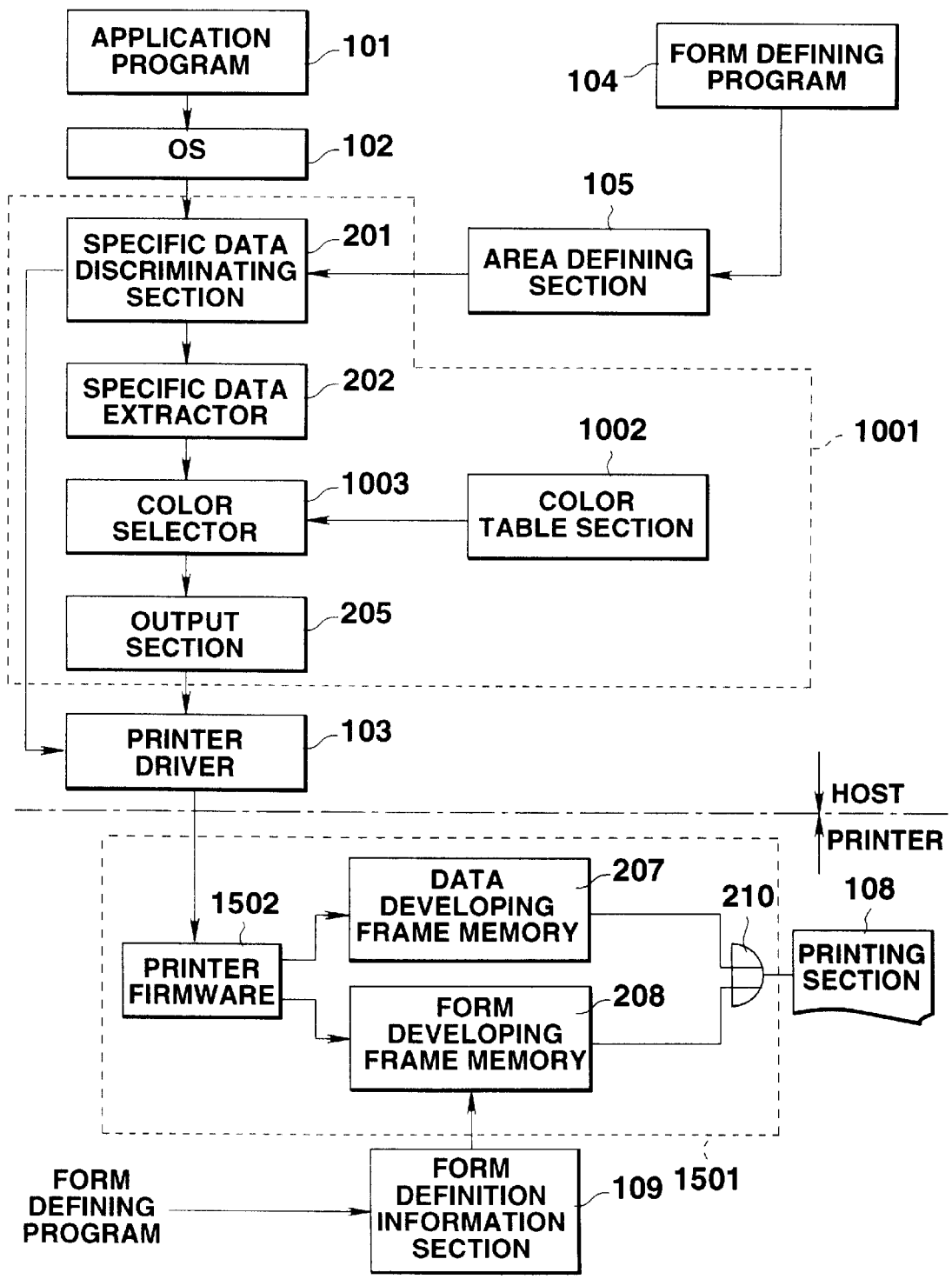
FIG. 15 is a functional block diagram of a printing system according to the third embodiment of this invention.

FIG. 15 is a functional block diagram of a printing system according to the third embodiment of this invention.

Like or same reference numerals are given to those components of the printing system of this embodiment which are the same as or identical to the corresponding components of the printing systems of the first and second embodiments.

In the printing system of the third embodiment, the application program 101 in the host computer can designate background images of predetermined colors to be affixed to a spreadsheet row by row. While the form defining program 104 is the same as that of the first embodiment, a specific data item is a specific frame of a spreadsheet. The other structure of the third embodiment is the same as that of the second embodiment.

A printer firmware 1052 in a printer controller 1501 differs from the printer firmware in the second embodiment. The printer firmware 1502 develops the image data of the background image, designated by the application program 101, in the data developing frame memory 207 after changing its color changed by a color control command. The printer firmware 1502 can read the image data developed in the form developing frame memory 208. The other structure of the printer is the same as that of the second embodiment.

Figure 16:
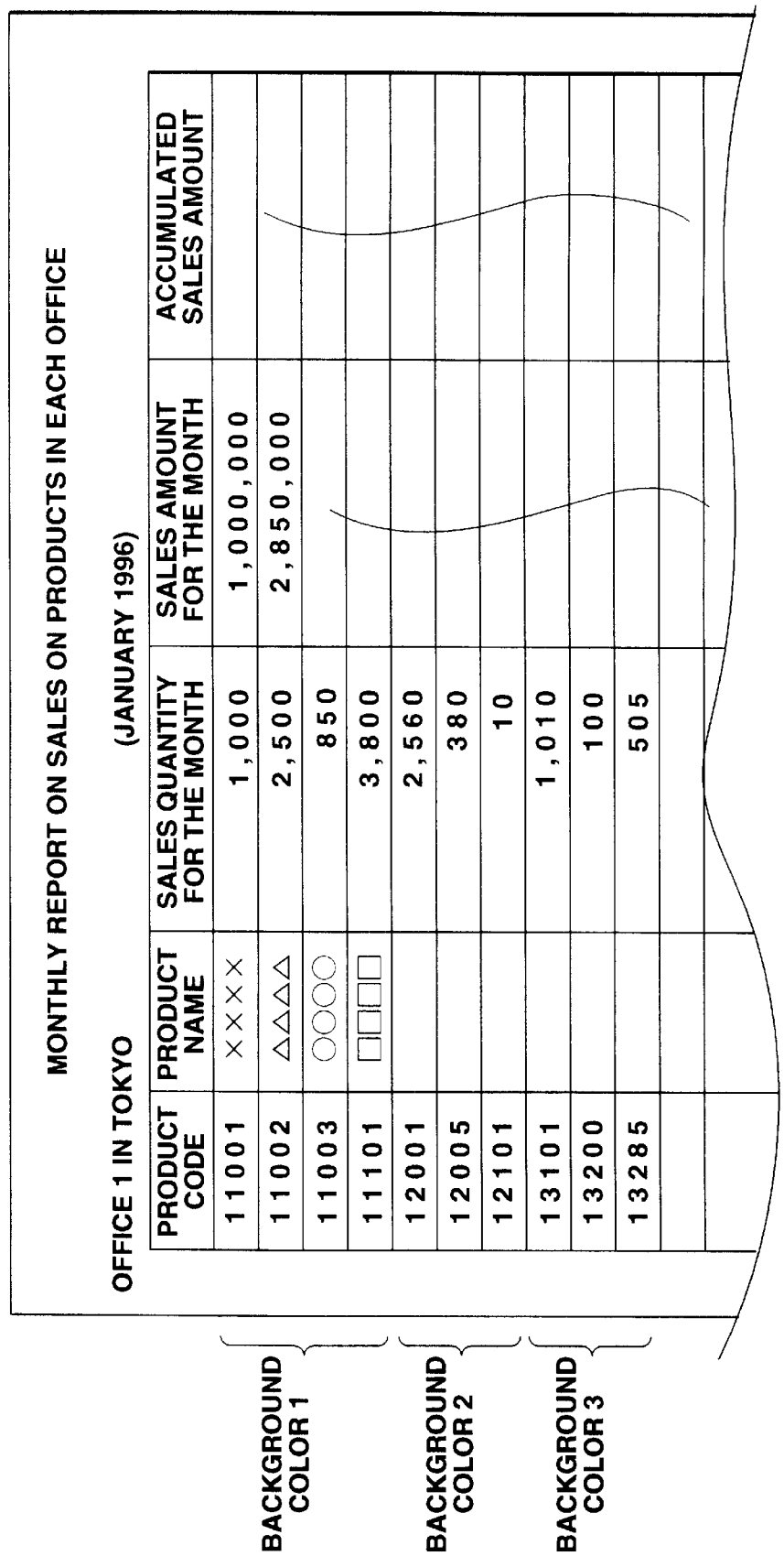
FIG. 16 is a diagram exemplifying a printed spreadsheet according to the third embodiment of this invention.

In this embodiment, a background image of a color according to a specific data item (a product code in this example) is affixed to each row of a spreadsheet as shown in FIG. 16.

The operation of this embodiment will now be described by referring to the flowchart in FIG. 17.

The operation of the host computer is the same as that of the second embodiment, except that because there are specific data items row by row, a color control command is sent once to the printer controller 1501 row by row.

Figure 17:
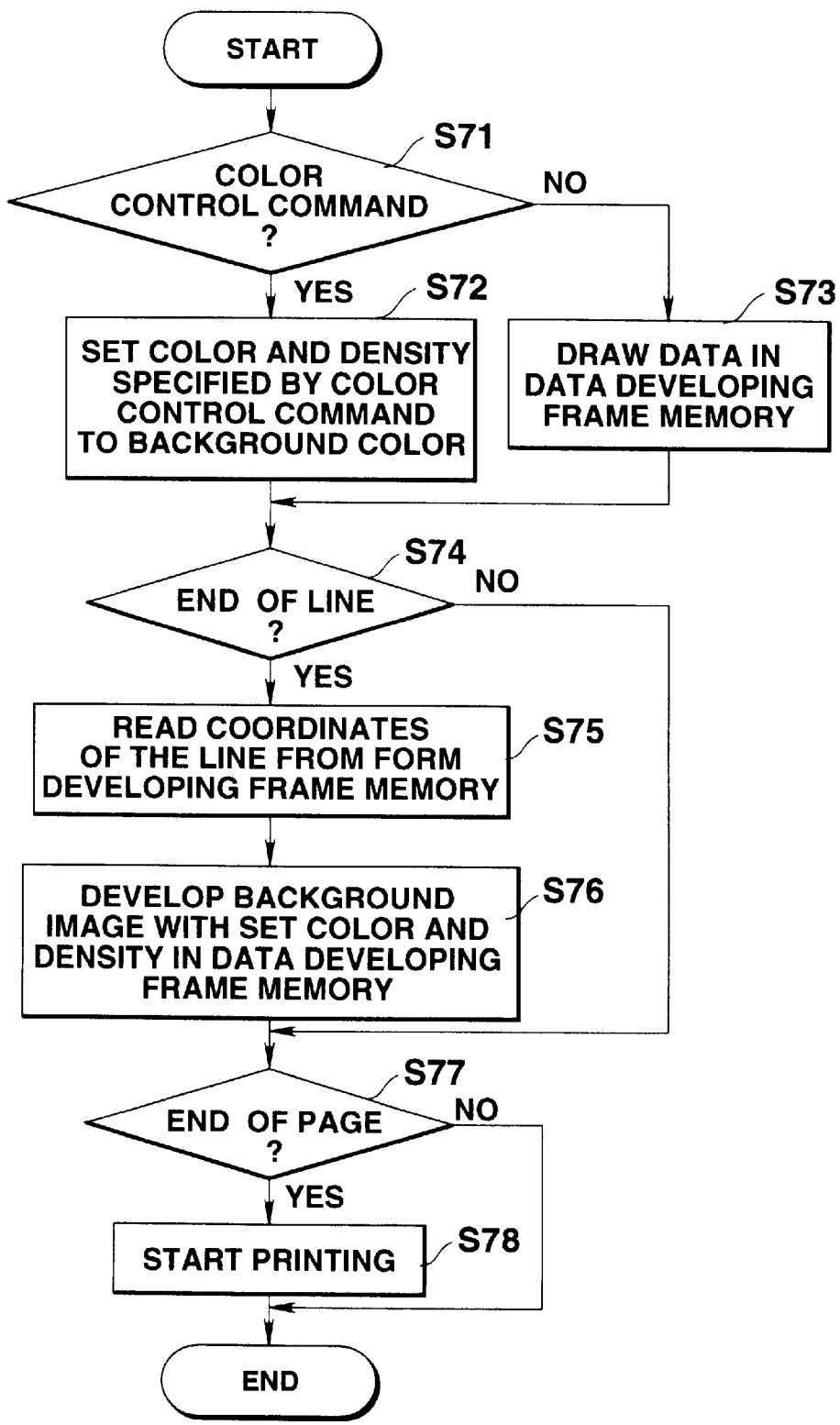
FIG. 17 is a flowchart illustrating a sequence of processes to be executed in a printer controller according to the third embodiment of this invention.

FIG. 17 presents a flowchart illustrating a sequence of processes to be executed in the printer controller 1501.

The processing in this flowchart starts every time the printer controller 1004 receives one character (including a control code) of print data or the color control command from the printer driver 103 of the host computer 1.

When the flow starts, it is discriminated if the received data is the color control command (step S71).

When it is not determined in step S71 that the received data is the color control command, the received data is print data. In this case, image data corresponding to that image data is developed in the data developing frame memory 207 (step S73) after which the flow proceeds to step S74. When the print data is a control code, the flow proceeds to step S74 without developing the image data in the frame memory 207.

When it is determined in step S71 that the received data is the color control command, the color and density according to the contents of the color control command are set as color information of an index in the printer firmware 1005 (step S72). The flow then proceeds to step S74.

In step S74, it is determined whether or not one line of data is ended by checking if the received data is a line feed code in the print data.

When it is not determined in step S74 that it is the end of one line of data, the flow proceeds to step S77.

When it is determined in step S74 that it is the end of one line of data, the form data developed in the form developing frame memory 208 is referred to read out the coordinate positions of the left end, the right end, the upper end and the lower end of that line (step S75).

Then, the image data of the background image with the color and density set in step S72 is developed in the data developing frame memory 207 in the area surrounded by the read coordinates. It is to be noted that in developing the image data of the background image, the image data of the background image will not be developed in the portion where the print data is already developed in order not to delete the developed print data (step S76). The flow then goes to step S77.

In step S77, it is determined whether or not one page of data is ended by checking if the received data is a page feed code in the print data.

When it is not determined in step S77 that it is the end of one page of data, the processing in this flowchart will be terminated directly.

When it is determined in step S77 that it is the end of one page of data, the print start signal is sent to the data developing frame memory 207 and the form developing frame memory 208 (step S78). The OR gate 210 synthesizes the image data output from the data developing frame memory 207 and the image data output from the form developing frame memory 208. Accordingly, image data acquired by synthesizing the image data of the print data developed in the data developing frame memory 207 and the image data of the form developed in the form developing frame memory 208 is supplied to the printing section 108. The processing in this flowchart will then be terminated.

When image data is supplied to the printing section 108 through the sequence of processes in the flowchart in FIG.

17, the printing section 108 forms an image corresponding to that image data on a sheet of paper.

According to the printing system of this embodiment, as described above, background images of different colors can be affixed to a spreadsheet row by row based on the contents of print data generated by the application program 101. This allows the user to easily grasp the contents of the data written in each spreadsheet without involving tedious works.

Modifications of Embodiments

According to the first embodiment, the entire color of a form is changed in accordance with the contents of the data of a specific data item. According to the second embodiment, an index of a predetermined color is printed in accordance with the contents of the data of a specific data item. According to the third embodiment, the color of the background is changed in accordance with the contents of the data of a specific data item. This invention is not however limited to those embodiments. In this invention, the gradation may also be altered. When image data is redrawn in the form developing frame memory 207, a tint pattern, not colors, may be changed. Further, only a part of image data, such as the color of the frame of a spreadsheet or the background color, may be altered.

The colors of special modification information, such as a ruled line, underline and hatching, may be altered separately. For instance, a table for setting color designation conditions according to the contents of a specific data item may be provided as shown in FIG. 18A, so that colors can be changed as shown in FIG. 18B according to this table.

Figures 19A, 19B:
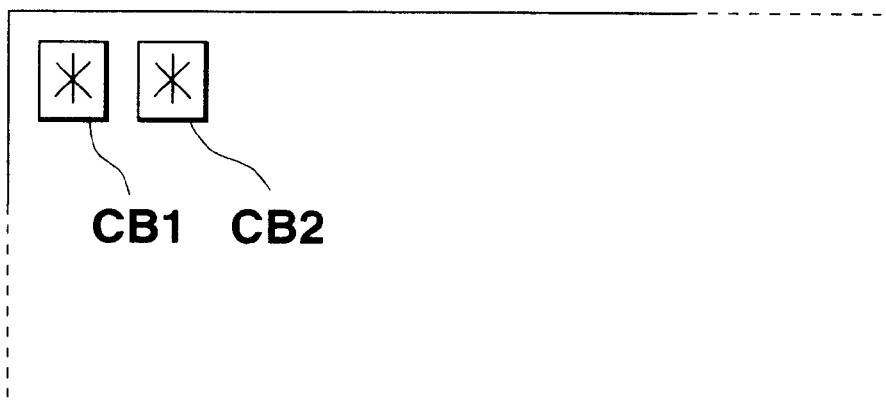
FIG. 19A is a diagram exemplifying a printed spreadsheet with check blocks as specific data items according to another modification of this invention.
FIG. 19B is a diagram showing an example of a color table corresponding to the check blocks in FIG. 19A.

According to the first to third embodiments, the header of a spreadsheet or a specific item of a spreadsheet is designated as a specific data item, and data of the specific data item is character data. This invention however is not limited to this particular case. As shown in FIG. 19A, for example, check blocks CB1 and CB2 to be printed on a spreadsheet may be treated as specific data items. In this case, a color table associated with the check blocks CB1 and CB2 as shown in FIG. 19B should be provided.

This invention is not limited to the first to third embodiments in which the color and font of print data are printed as set by the application program 101. For instance, the color of print data may be changed based on the contents of data of a specific data item. The font of print data may also be altered on the basis of the contents of the data of a specific data item. Print data may be modified with bold, italic or the like based on the contents of the data of a specific data item.

Although the color of an index (including gradation) is altered in accordance with the contents of the data of a specific data item according to the second embodiment, this invention is not limited to this particular case. For example, the print position of an index may be changed in accordance with the contents of the data of a specific data item. Further, a predetermined bar code, not an index, may be printed in accordance with the contents of the data of a specific data item.

Although the data discriminating section 106 or 1001 generates a color control command based on print data of a specific data item and sends the print data after sending the color control command in the first to third embodiments, such is not restrictive in this invention. For example, print data of a specific data item may be sent out character by character even prior to the generation of a color control command.

Although there is only one specific data item for designating the color of the background or an index according to the first to third embodiments, a plurality of specific data items may be used. In the latter case, a table should be searched based on the combination of those specific data items.

Although a table which is searched in order to generate a color table number according to the contents of the data of a specific data item in the first to third embodiments, this invention is not limited to this case. For instance, a value indicated by data of a specific data item may be computed using a predetermined equation so that a color table number is generated according to the computation result. The color may be altered by an equation (with overflow taken into consideration), like a color number+x, not by referring to a table. In this case, the color control command indicates this equation and the color conversion table becomes unnecessary.

Further, this invention is not limited to the case of the first to third embodiments where the color selector 204 or 1003 generates a color control command indicating the color conversion correlation by referring to the color conversion table section 203 or the color table section 1002. If a color conversion table is provided in the printer 2, for instance, the host computer 1 should send out only a color table number.

Although the foregoing description of the first to third embodiments has been given of the printing system which prepares the form of a spreadsheet by means of the form defining program 104, this invention is in no way limited to this case. This invention may also be adapted to a printing system which prepares a form by an application program. This invention may also be adapted to a printing system which prints out data retrieved from a data base. Furthermore, this invention may be adapted to a printing system which prints a tint or the like on the background.

This invention is not limited to the case where the form defining program 104 generates a form as in the first to third embodiments. For example, this invention may be adapted to a printing system which prints a form previously determined by the application program 101.

Although specific data items are designated and background colors are given row by row of a spreadsheet in the third embodiment, specific data items may be designated and background colors may be given column by column. Instead of a single row or a single column, a plurality of rows or columns may be used as one unit.

According to the first to third embodiments, the printer 2 has the frame memory 207 for developing print data and the frame memory 208 for developing form data and images developed in both memories are overlaid one on the other, this invention is not limited to this case. For instance, the printer 2 may have only a single frame memory so that print data is developed after the development of form data. The printer may separately have a frame memory for developing the image of the background or an index alone.

Although the foregoing description of the first to third embodiments has been given of the case where this invention is adapted to a printing system which comprises a host computer and a printer, this invention may also be adapted to a word processor which has a computer and a printer integrated together.

Although the data discriminating section 106 or 1001 in the host computer 1 generates a color control command and sends it to the printer controller 107 in the first to third embodiments, this invention is not limited to this structure. For example, a color conversion table may be provided in the printer 2 and the color of a form may be changed in the processing in the printer 2 based on print data which is supplied directly from the host computer 1. Print data may be converted to image data in the host computer 1 before being sent to the printer 2.

Although the foregoing description of the first to third embodiments has been given of the case where this invention is adapted to a printing system which forms an image on a sheet of paper, this invention may be adapted, as well, to other image output systems including the one which displays an image on a display unit like a CRT (Cathode Ray Tube).

Although the printing section 108 forms an image on a sheet of paper using an electrophotography technique in the first to third embodiments, this invention is not limited to this case. For instance, an image may be formed on a sheet of paper by an ink jet system or a thermal transfer system. The medium on which the printing section 108 forms an image is not limited to paper but other types of sheet-like recording media, such as an OHP film, can be used as well.

According to the first to third embodiments, processing programs for accomplishing the functions of this invention are stored in a hard disk unit in the host computer 1 and are read out on the main memory to be executed. This invention is not however restricted to this particular type. The processing programs in this invention may be stored in a storage medium like a CD-ROM which is detachable from the host computer 1. When processing programs in this invention are stored on a CD-ROM, a CD-ROM drive should be connected to the host computer 1 which reads the processing programs via this CD-ROM drive.

What is claimed is:

1. A merged image print out system comprising:

form defining information preparing means for preparing form defining information for generating a predetermined form;

textual content information generation means for generating textual content information to be merged into said predetermined form;

area designation means for designating a specific area in said predetermined form;

identifying means for identifying specific textual content information in said textual content information which is to be merged into the designated specific area;

alteration rule defining means for defining an alteration rule for said form defining information corresponding to said specific textual content information;

print attribution altering means for selecting said alteration rule corresponding to said specific textual content information identified by said alteration rule defining means, and for altering print attribution of said form defining information based on said selected alteration rule; and merged image printing means for generating print image information in which said form defining information having said altered print attribution and said textual content information are merged together based on said form defining information and said textual content information, and for printing out said generated print image information.

2. The merged image print out system according to claim 1, wherein said merged image printing means includes print means for merging an image based on said textual content information into an image based on said form defining information, and for printing said merged image on a sheet-like recording medium.

3. The merged image print out system according to claim 1, wherein said form defining information includes information for designating a color of said predetermined form; and wherein said print attribution altering means alters said information for designating said color of said predetermined form to change said color of said predetermined form.

4. The merged image print out system according to claim 1, wherein said form defining information includes an index to be formed in a part of an image to be output and information for designating a color of said index; and wherein said print attribution altering means alters said information for designating said color of said index to change said color of said index to be printed.

5. The merged image print out system according to claim 1, wherein said form defining information includes an index to be formed in a part of an image to be output and information for designating a position where said index is formed; and wherein said print attribution altering means alters said information for designating said position of said index to change a print position of said index.

6. The merged image print out system according to claim 1, wherein said form defining information includes a background image to be output on a background of said image based on said textual content information generated by said textual content information generation means, and information for designating a color of said background image; and wherein said print attribution altering means alters said information for designating said color of said background image to change said color of said background image.

7. The merged image print out system according to claim 1, wherein said form defining information includes a tint to be output on a background of said image based on said textual content information generated by said textual content information generating means, and information for designating a pattern of said tint; and wherein said print attribution altering means alters said information for designating a pattern of said tint to change said pattern of said tint.

8. A merged image print out system comprising:

form defining information preparing means for preparing form defining information for generating a predetermined form;

textual content information generation means for generating textual content information to be merged into said predetermined form;

area designation means for designating a specific area in said predetermined form;

identifying means for identifying specific textual content information in said textual content information which is to be merged into the designated specific area;

alteration rule defining means for previously defining an alteration rule for said specific textual content information;

print attribution altering means for selecting said alteration rule for said specific textual content information, and for altering print attribution of said textual content information based on said selected alteration rule; and merged image printing means for generating print image information in which said form defining information and said textual content information having said altered print attribution are merged together based on said form defining information and textual content information, and for printing out said generated print image information.

9. The merged image print out system according to claim 8, wherein said merged image printing means has print means for merging an image based on said textual content information into an image based on said form defining information, and for printing said merged image on a sheet-like recording medium.

10. The merged image print out system according to claim 8, wherein said predetermined form is a spreadsheet;

said textual content information generated by said textual content information generation means includes color designation information for designating colors of said spreadsheet row by row or column by column;

said area designation means designates a specific cell in a row or a column of said spreadsheet; and wherein said print attribution altering means alters said color designation information to change said colors of said spreadsheet row by row or column by column based on said alteration rule for textual content in said specific cell selected by said alteration rule defining means.

11. A method for outputting a merged image using a merged image print out system having textual content information generation means for generating textual content information to be printed out after being merged into a predetermined form generated on the basis of form defining information which is previously prepared by form defining information preparing means, merged image print out means for merging an image based on said textual content information generated by said textual content information generation means into an image of said predetermined form and for outputting the merged image, and alteration rule defining means for previously defining an alteration rule for said form corresponding to specific textual content information, said method comprising the steps of:

an area designation step of designating a specific area in said predetermined form;

a textual content information identifying step of controlling said alteration rule defining means to identify content of said textual content information in said textual content information generated by said textual content information generation means, which is to be output after being merged into said specific area designated by said area designation step, and to select said alteration rule corresponding to the identified content of said textual content information;

an image alteration step of altering said image of said predetermined form in accordance with said alteration rule selected by said textual content information identifying step; and an image output step of merging said image of said textual content information generated by said textual content information generation means into said image of said predetermined form changed by said image alteration step, and outputting the merged image.

12. A method for outputting a merged image using a merged image print out system having textual content information generation means for generating textual content information to be printed out after being merged into a predetermined form generated on the basis of form defining information which is previously prepared by form defining information preparing means, merged image print out means for merging an image based on said textual content information generated by said textual content information generation means into an image of said predetermined form and for outputting the merged image, and alteration rule defining means for previously defining an alteration rule for said textual content information corresponding to specific textual content information, said method comprising the steps of:

an area designation step of designating a specific area in said predetermined form;

a textual content information identifying step of controlling said alteration rule defining means to identify content of said textual content information in said textual content information generated by said textual content information generation means, which is to be output after being merged into said specific area designated by said area designation step, and to select said alteration rule corresponding to the identified content of said textual content information;

an image alteration step of altering said image of said textual content information generated by said textual content information generation means in accordance with said alteration rule selected by said textual content information identifying step; and an image output step of merging said image of said textual content information changed by said image alteration step into said image of said predetermined form, and outputting the merged image.

* * * * *